United States Patent
Burgess et al.

(10) Patent No.: US 12,239,904 B2
(45) Date of Patent: *Mar. 4, 2025

(54) CONTROLLER FOR A GAMES CONSOLE

(71) Applicant: Ironburg Inventions Limited, Wincanton (GB)

(72) Inventors: Simon Burgess, Leicester (GB); Duncan Ironmonger, Milton, GA (US)

(73) Assignee: Ironburg Inventions Limited, Wincanton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,445

(22) Filed: Dec. 8, 2023

(65) Prior Publication Data

US 2024/0131421 A1  Apr. 25, 2024

Related U.S. Application Data

(63) Continuation of application No. 17/395,798, filed on Aug. 6, 2021, now Pat. No. 11,872,478, which is a continuation of application No. 16/600,839, filed on Oct. 14, 2019, now Pat. No. 11,110,345, which is a continuation of application No. 15/542,151, filed as application No. PCT/EP2016/050311 on Jan. 8, 2016, now Pat. No. 10,441,881.

(60) Provisional application No. 62/101,420, filed on Jan. 9, 2015.

(51) Int. Cl.
*A63F 13/24* (2014.01)
*A63F 13/20* (2014.01)

(52) U.S. Cl.
CPC ............. *A63F 13/24* (2014.09); *A63F 13/20* (2014.09); *A63F 2300/10* (2013.01); *A63F 2300/1043* (2013.01)

(58) Field of Classification Search
CPC ...... A63F 13/20; A63F 13/24; A63F 2300/10; A63F 2300/1043
USPC .......................................................... 463/37
See application file for complete search history.

(56) References Cited

U.S. PATENT DOCUMENTS

| | | | | |
|---|---|---|---|---|
| 4,395,134 A | * | 7/1983 | Luce | G04G 17/005 968/887 |
| 5,279,194 A | * | 1/1994 | Armbrust | B23B 31/263 82/160 |
| 5,291,336 A | * | 3/1994 | Miles | G02B 26/0816 606/18 |
| 5,430,262 A | * | 7/1995 | Matsui | H01H 25/041 200/18 |
| 5,687,080 A | * | 11/1997 | Hoyt | G05G 9/047 345/161 |
| 5,841,372 A | * | 11/1998 | Matsumoto | A63F 13/24 341/20 |
| 5,846,183 A | * | 12/1998 | Chilcoat | A61B 1/00142 600/120 |

(Continued)

FOREIGN PATENT DOCUMENTS

GB  2204387  * 11/1988  ... G05G 2009/04744

*Primary Examiner* — Michael A Cuff
(74) *Attorney, Agent, or Firm* — Walters & Wasylyna LLC

(57) ABSTRACT

A hand held controller for a games console comprising an outer case and at least one control located on the controller. The controller is shaped to be held in at least one hand of a user such that the at least one control is operable by the user. The at least one control extends through an aperture provided in the outer case, and wherein the controller comprises a removable buffer mounted within the aperture.

20 Claims, 8 Drawing Sheets

(56) References Cited

U.S. PATENT DOCUMENTS

| | | | | |
|---|---|---|---|---|
| 5,883,690 | A * | 3/1999 | Meyers | G05G 9/047 345/157 |
| 6,471,530 | B1 * | 10/2002 | Gimbatti | H01R 13/005 439/485 |
| 6,590,171 | B1 * | 7/2003 | Wolf | G05G 1/06 200/6 A |
| 6,752,719 | B2 * | 6/2004 | Himoto | A63F 13/22 463/47 |
| 7,758,424 | B2 * | 7/2010 | Riggs | A63F 13/285 341/20 |
| 7,859,514 | B1 * | 12/2010 | Park | A63F 13/24 345/184 |
| D658,178 | S * | 4/2012 | Ikeda | D14/401 |
| 9,804,691 | B1 * | 10/2017 | Strahle | G06F 3/033 |
| 2001/0003713 | A1 * | 6/2001 | Willner | G06F 3/0219 348/E5.103 |
| 2001/0025778 | A1 * | 10/2001 | Ono | H01H 13/64 200/1 B |
| 2005/0215321 | A1 * | 9/2005 | Hussaini | A63F 13/24 463/37 |
| 2006/0025217 | A1 * | 2/2006 | Hussaini | A63F 13/24 463/36 |
| 2006/0116204 | A1 * | 6/2006 | Chen | A63H 30/04 463/37 |
| 2007/0281787 | A1 * | 12/2007 | Numata | A63F 13/218 463/36 |
| 2008/0261695 | A1 * | 10/2008 | Coe | A63F 13/22 463/37 |
| 2009/0054146 | A1 * | 2/2009 | Epstein | A63F 13/22 463/38 |
| 2010/0073283 | A1 * | 3/2010 | Enright | G06F 3/0383 345/156 |
| 2011/0105231 | A1 * | 5/2011 | Ambinder | A63F 13/24 463/38 |
| 2012/0068625 | A1 * | 3/2012 | Matthews | H05B 47/10 315/307 |
| 2012/0088582 | A1 * | 4/2012 | Wu | A63F 13/5255 463/37 |
| 2012/0142418 | A1 * | 6/2012 | Muramatsu | A63F 13/24 463/37 |
| 2012/0142419 | A1 * | 6/2012 | Muramatsu | A63F 13/24 463/37 |
| 2014/0027407 | A1 * | 1/2014 | Deshpande | B24B 37/30 216/53 |

* cited by examiner

CONTROLLER FOR A GAMES CONSOLE

This application is a continuation of U.S. Ser. No. 17/395,798 filed on Aug. 6, 2021, which is a continuation of U.S. Ser. No. 16/600,839 filed on Oct. 14, 2019, which is a continuation of U.S. Ser. No. 15/542,151 filed on Jul. 7, 2017, which is a U.S. national phase application of Intl. App. No. PCT/EP2016/050311 filed on Jan. 8, 2016, which claims priority from U.S. Ser. No. 62/101,420 filed on Jan. 9, 2015. The entire contents of U.S. Ser. No. 17/395,798, U.S. Ser. No. 16/600,839, U.S. Ser. No. 15/542,151, Intl. App. No. PCT/EP2016/050311 and U.S. Ser. No. 62/101,420 are incorporated herein by reference.

TECHNICAL FIELD

The present invention relates to games consoles, in particular to hand held controllers for games consoles.

BACKGROUND

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers. An example of a conventional controller is shown in FIG. 1.

As can be seen in FIG. 1, controls are mounted on the front and top of the controller 1. Specifically, there are left and right analogue thumb sticks 2, 3 which normally control movement and are intended to be operated by the user's left and right thumbs respectively. There are four buttons 4 located on a front-right portion of the controller 1, which normally control additional actions and are intended to be operated by the user's right thumb. There is a direction pad 5 located on the lower portion of the front-left of the controller 1. The direction pad 5 is intended to be operated by the user's left thumb, typically either as an alternative to the left thumb stick 2 or to provide additional actions. There are a left trigger 6, a right trigger 7, a left bumper 8 and a right bumper 9 located on the front edge of the controller 1. The left and right triggers 6, 7 are typically operated by a user's index fingers. The left and right bumpers 8, 9 may also be operated by a user's index fingers.

The thumb sticks 2, 3 and the direction pad 5 each comprise directionality; that is to say the controller is capable of determining the direction in which the thumb sticks 2, 3 or direction pad 5 are moved or pressed by a user. As shown, the right thumb stick 3 is configured such that a forward movement is achieved by moving the thumb stick towards the front of the controller, as indicated by direction arrow F; backward movement is achieved by moving the thumb stick towards the back of the controller, as indicated by direction arrow B; right and left movements are achieved by moving the thumb stick to the right or left respectively, as indicated by direction arrows R, L. The left thumb stick 2 and directional pad 5 are similarly configured.

It has been found that some components of known controllers may fail or break in areas subject to wear through repeated use in particular where two components can make contact or impact with each other, it is desirable to provide a more robust controller thereby improving the longevity of the controller.

It is an object of the disclosure to provide a serviceable controller in which parts of the controller subject to wear can be readily replaced.

It is also desirable to provide a controller which is readily customised to suit a user's needs or taste.

The present invention seeks to overcome or at least mitigate the problems of the prior art.

SUMMARY

According to a first aspect of the present invention there is provided a hand held controller for a games console comprising:
an outer case; and
at least one control located on the controller;
the controller being shaped to be held in at least one hand of a user such that the at least one control is operable by the user;
wherein the at least one control extends through an aperture provided in the outer case;
the controller comprising a removable buffer mounted within the aperture.

Optionally, the buffer comprises an annular ring having an aperture for accommodating a portion of the at least one control disposed external to the outer case.

Optionally, the aperture is configured to prevent a portion of the at least one control disposed internally of the outer case from passing therethrough.

Optionally, the buffer comprises a mechanical fastening means.

In some embodiments, the fastening means comprises a bayonet style fastener having a male component and a female receptor.

In some embodiments, the fastening means comprises a screw thread.

Optionally, the buffer is configured to prevent the at least one control making contact with the outer case when in use.

In some embodiments, the buffer is formed from a metallic material.

In some embodiments, the buffer is formed from a plastics materials.

In some embodiments, the buffer is formed from a resiliently deformable material.

Optionally, the buffer comprises a drive member for engaging with a tool.

Optionally, the drive member comprises a one or more recesses defined in the buffer.

Optionally, the tool comprises a one or more lugs for engaging with a respective one of the one or more cutaways.

Optionally, the buffer comprises at least one end stop to limit rotation of the buffer with respect to the outer case.

According to a second aspect of the present invention there is provided a hand held controller for a games console comprising:
an outer case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller;
wherein at least one first control extends through an aperture provided in the outer case and the at least one control is moveable within the aperture,
the controller comprising a removable buffer mounted within the aperture.

According to a third aspect of the present invention there is provided a retainer for securing a portion of a control device to a hand held controller, the retainer comprising an annular ring having an aperture for receiving a portion of a control device, the retainer having a first part of a securing mechanism for engaging with a second part of the securing mechanism provided on the controller, wherein in use the retention ring forms a buffer between the control device and an outer case of the controller.

Further features and advantages of the present invention will be apparent from the specific embodiments illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION OF EMBODIMENTS

Detailed descriptions of specific embodiments of the games controller are disclosed herein. It will be understood that the disclosed embodiments are merely examples of the way in which certain aspects of the invention can be implemented and do not represent an exhaustive list of all of the ways the invention may be embodied. Indeed, it will be understood that the games controller described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
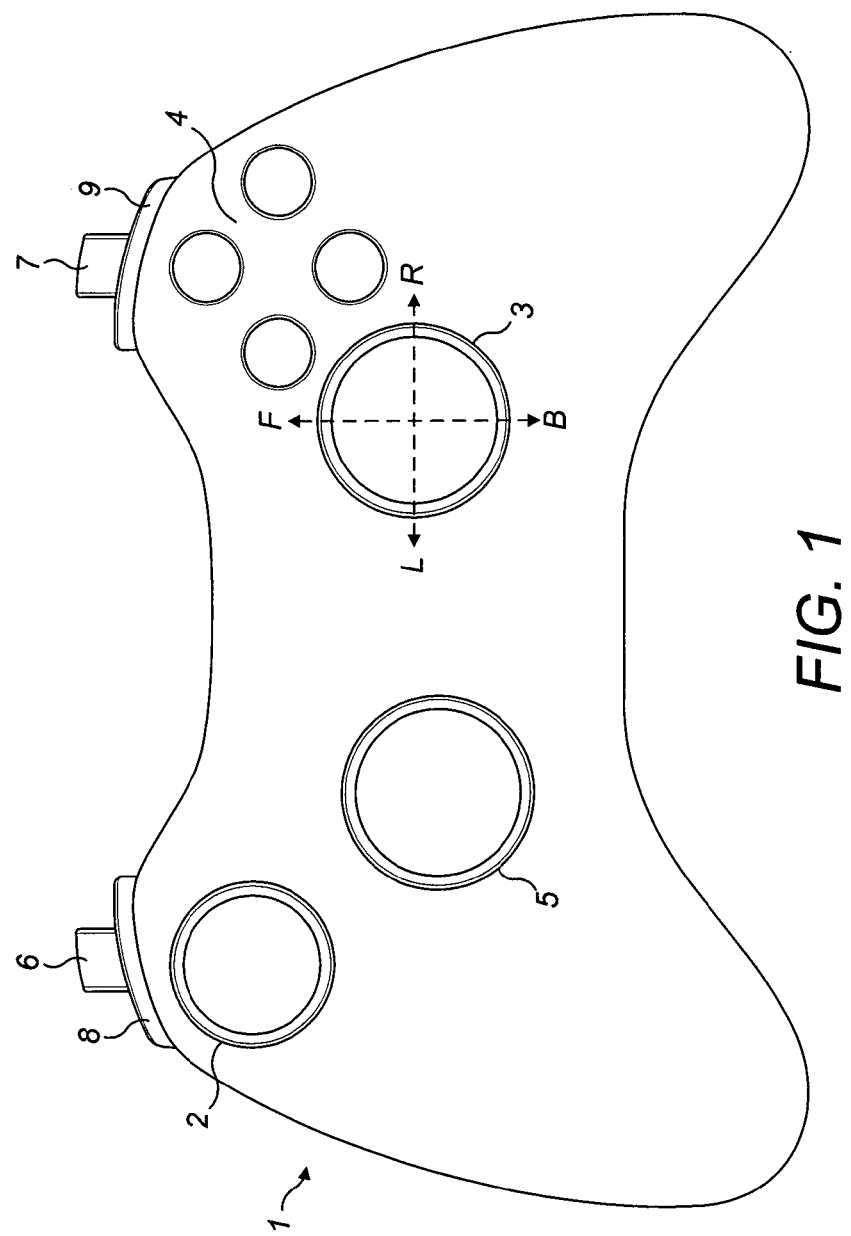
FIG. 1 is a schematic illustration of the front of a conventional games console controller according to the prior art.
Figure 2:
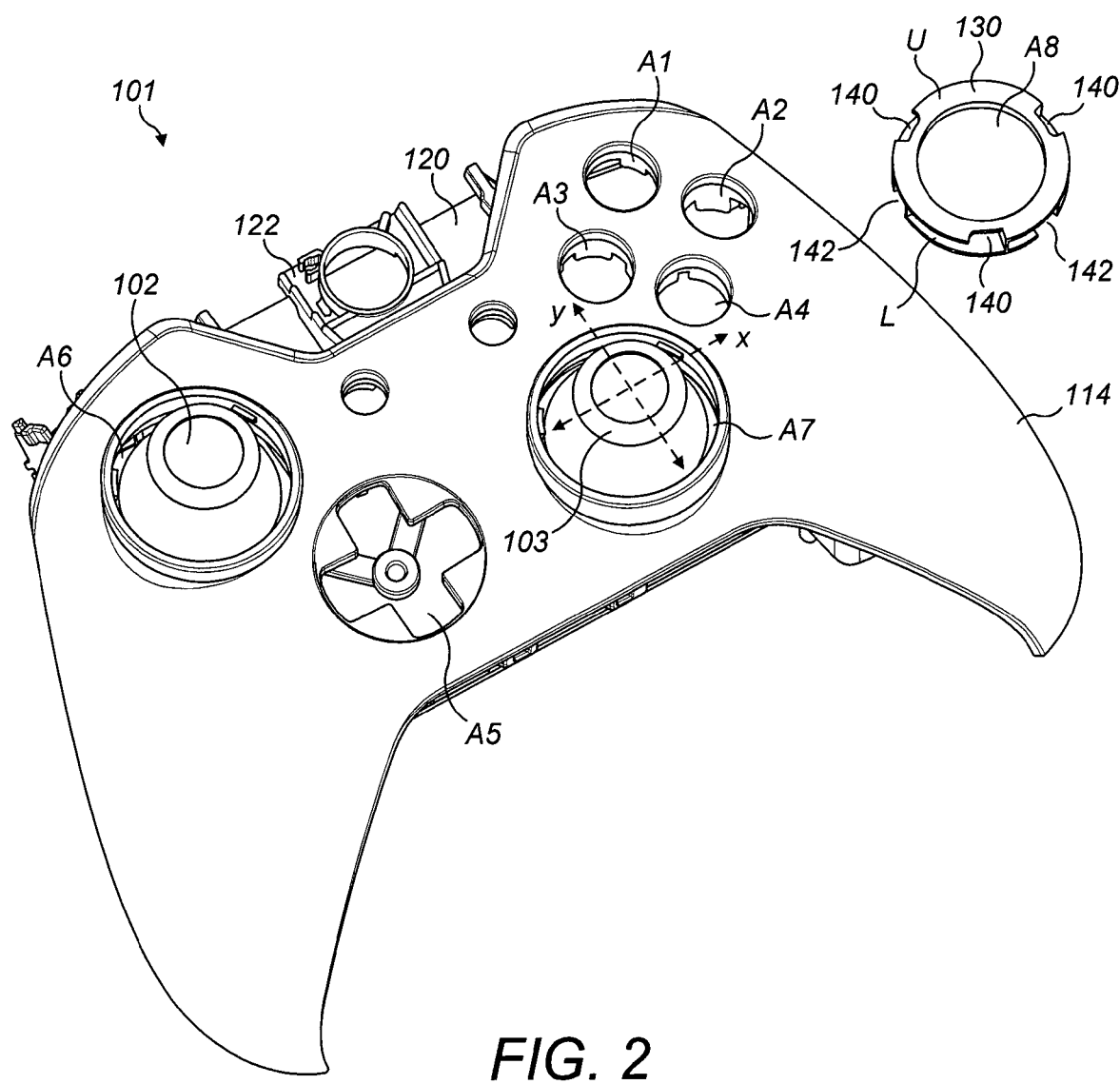
FIG. 2 is a perspective view from above of components for forming a games controller according to an embodiment of the invention.
Figure 3:
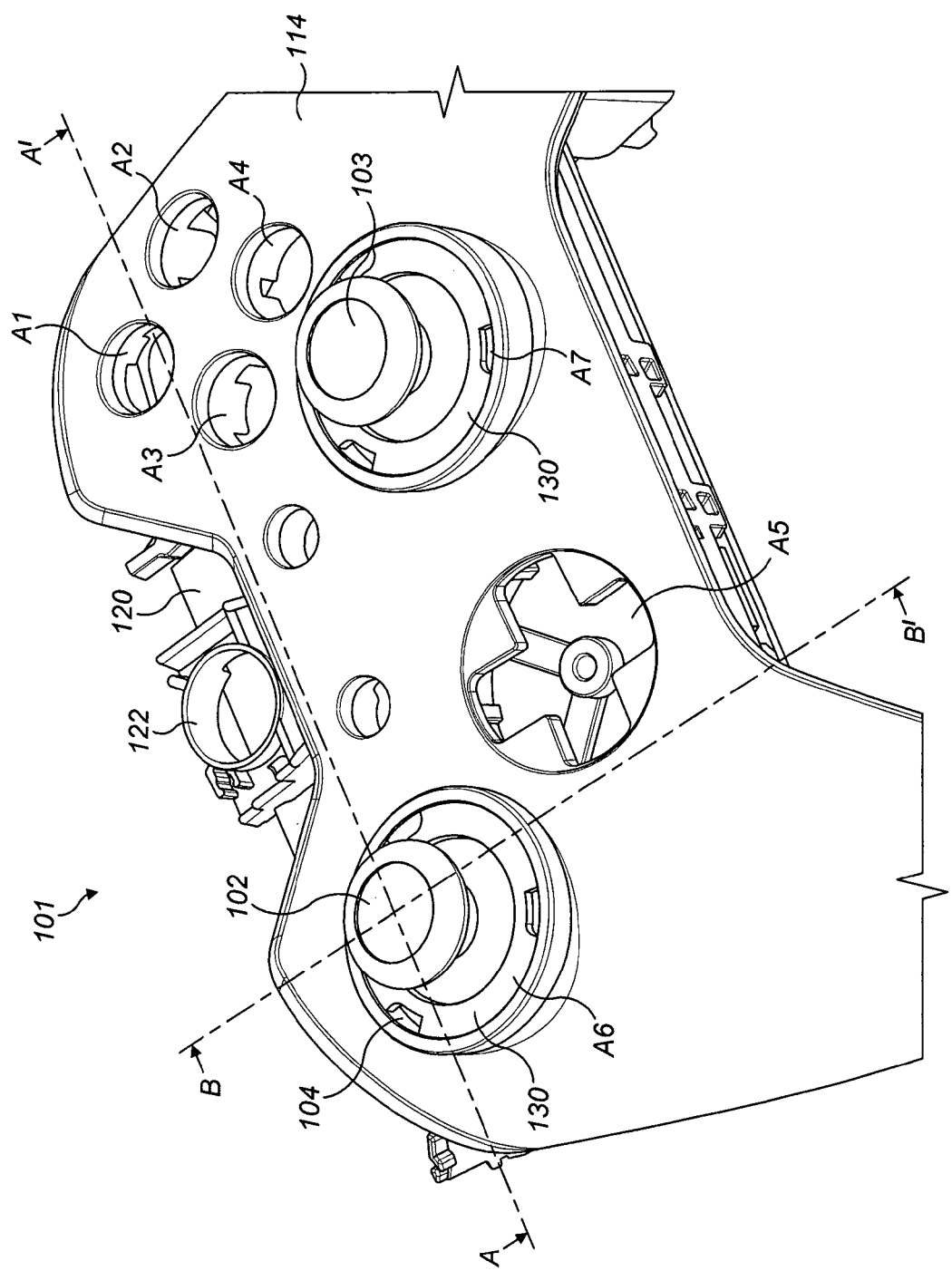
FIG. 3 is a perspective view of the components shown in FIG. 2 in an assembled state.

Referring to FIG. 2 there is shown components for forming a controller 101 according to an embodiment of the invention.

The controller 101 comprises controls that are mounted on the front and top of the controller 101. The controller 101 comprises a left analogue thumb stick 102 and a right analogue thumb stick 103. The left analogue thumb stick 102 and the right analogue thumb stick 103 normally control movement actions and are intended to be operated by the user's left and right thumbs respectively. The controller 101 comprises four buttons; the buttons are omitted from FIGS. 2 to 7. The buttons are located in a respective one of the four apertures A1, A2, A3, A4, provided in a front-right portion of an upper surface of the controller 101, in the illustrated embodiment the upper surface is defined an upper case member 114. The buttons, which normally control additional actions, are intended to be operated by the user's right thumb. The controller 101 comprises a direction pad located on the lower portion of the front left of the upper case member 114 of the controller 101. The direction pad has been omitted from FIGS. 2 to 8; the direction pad is received in the aperture A5 provided in the upper case member 114 of the controller 101. The direction pad is intended to be operated by the user's left thumb, typically either as an alternative to the left thumb stick 102 or to provide additional actions. The controller 101 may also comprise a left trigger (not shown), a right trigger (not shown), a left bumper (not shown), and a right bumper (not shown), located on the front edge of the controller 101. The left and right triggers are typically operated by a user's index or fore fingers. The left and right bumpers may also be operated by a user's index or fore fingers. The controller 101 also comprises a lower case member (not shown) and detachable grip elements (not shown) which, together with the upper case member 114, form a housing or body of the controller 101.

The thumb sticks 102, 103 and the direction pad each comprise directionality; that is to say the controller 101 is capable of determining or sensing the direction in which the thumb sticks 102, 103 or the direction pad are moved or pressed by a user.

Figure 4:
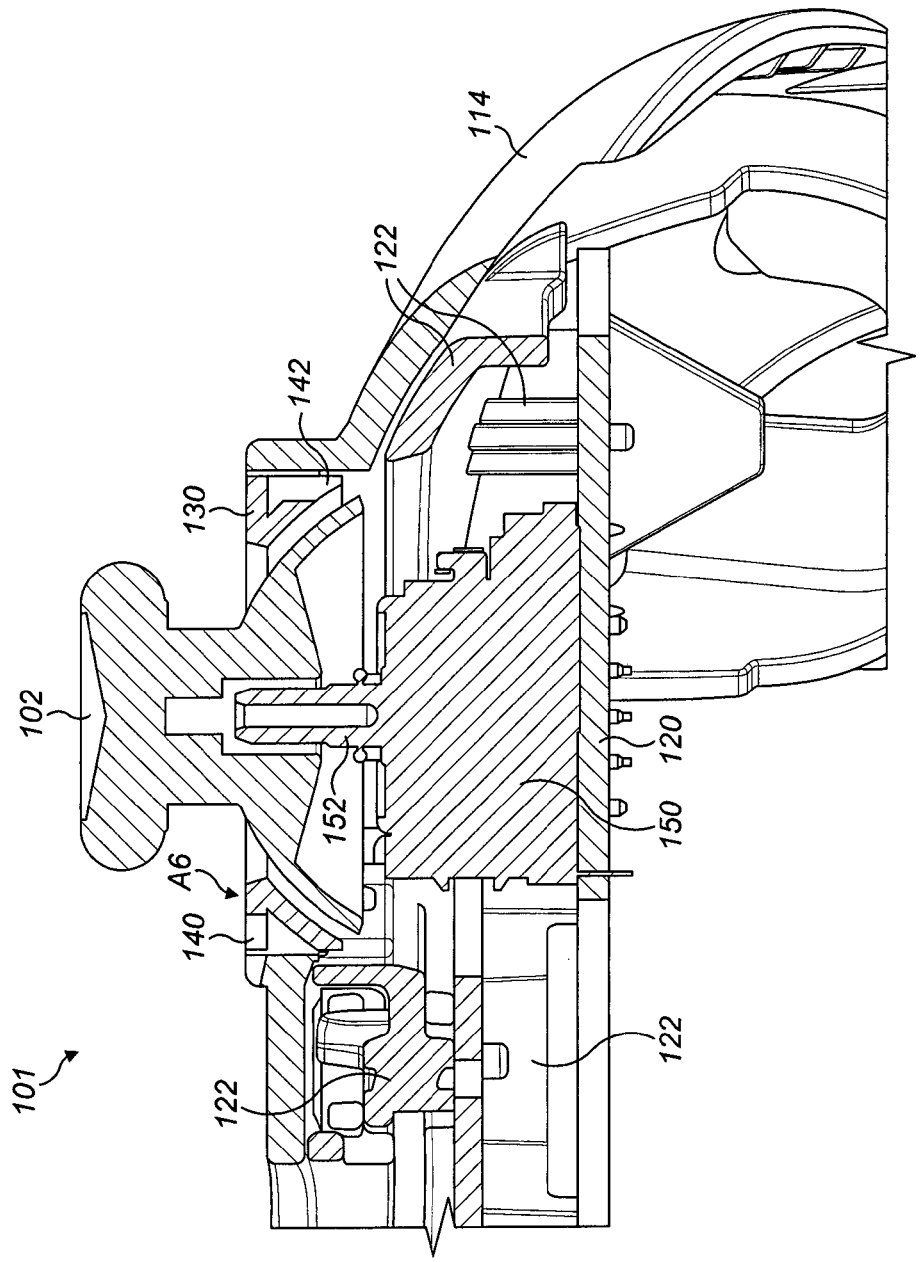
FIG. 4 is a first sectional view of the controller of FIG. 3 along the line A-A'.
Figure 5:
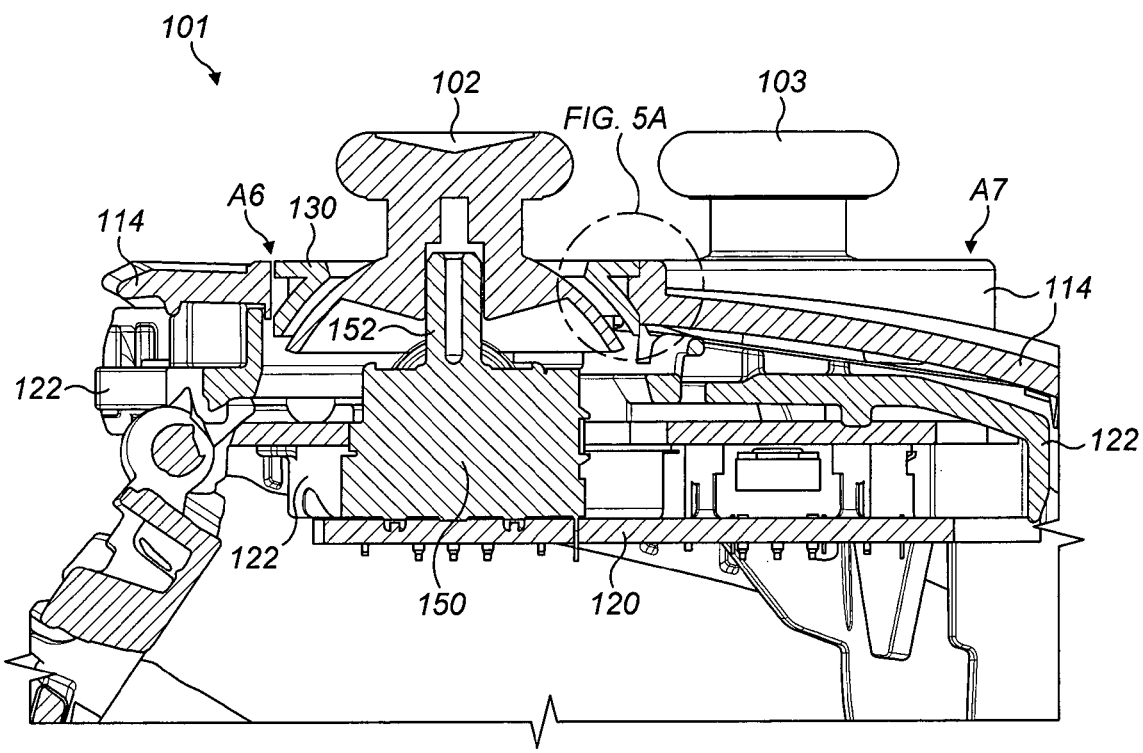
FIG. 5 is a second sectional view of the controller of FIG. 3 along the line B-B'.

The left thumb stick 102 is mounted to an actuator mechanism 150 having a post 152 (see FIGS. 4 and 5). The actuator mechanism 150 is mounted on a circuit board 120. The actuator mechanism 150 may comprise an analogue stick coupled to a pair of potentiometers, a first potentiometer configured to sense movement in a first direction indicated by direction arrow x in FIG. 2 and a second potentiometer configured to sense movement in a second direction indicated by direction arrow y in FIG. 2. Optionally the analogue stick is self centering; that is to say when no input is applied by a user the analogue stick adopts a central position. The left thumb stick 102 is received in a first stick aperture A6 provided in the upper case member 114. The left thumb stick 102 is mounted on the post 152.

The right thumb stick 103 is mounted to an actuator mechanism post (not shown) which is mounted on a circuit board 120. The actuator mechanism may comprise an analogue stick coupled to a pair of potentiometers. Optionally the analogue stick is self centering. The right thumb stick 103 is received in a second stick aperture A7 provided in the upper case member 114. The right thumb stick 103 is mounted on the post.

The circuit board 120 is mounted to a chassis member 122; the upper case member 114 is mounted to the chassis member 122. The lower case member is mounted to the chassis member 122. The detachable grip elements are mounted to the lower case member.

In alternative embodiments the upper case member 114 or the lower case member may also form a chassis to which the circuit board 120 is mounted.

The controller 101 comprises a pair of retention rings 130; each retention ring 130 retains or secures a respective one of the left and right thumb sticks 102,103. The retention ring 130 comprises an aperture A8 configured to receive an upper portion of the respective left or right thumb stick 102, 103. The aperture A8 is dimensioned such that a lower portion of the left or right thumb stick 102,103 cannot pass through the retention ring 130.

Figure 5A:
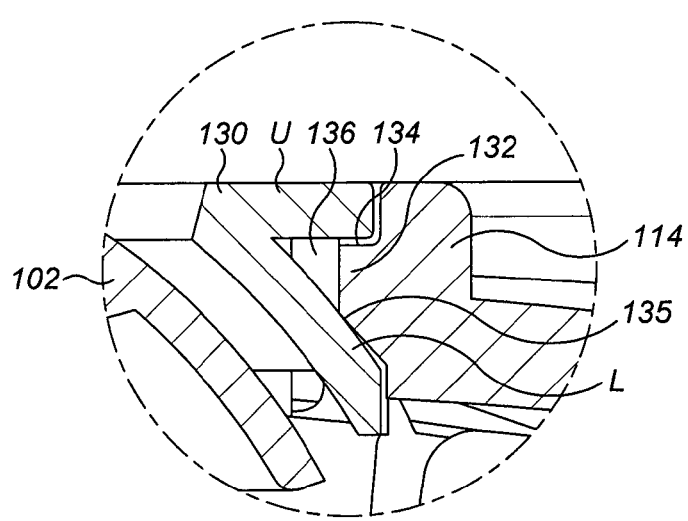
FIG. 5A is an enlarged view of a portion of the controller shown in FIG. 5.

The retention ring 130 is detachable from the upper case member 114. The retention ring 130 comprises a circumferential groove or recess 136 in an outer side wall thereof, see FIG. 5A. In the illustrated embodiment the retention ring 130 comprises a substantially "7" shaped cross-section. In alternative embodiments other cross-sectional shapes may be employed for example, but not limited to, an "I" or "C" shape. The retention ring 130 may comprise an upper annular ring coupled to a lower annular ring by a wall member. The wall member may be formed from a cylindrical wall. The cylindrical wall may be continuous or may be interrupted by one or more apertures.

The retention ring 130 comprises a plurality of first cutaways in the form of recesses 140 defined in an upper portion U. The illustrated embodiment comprises three first recesses 140. The first recesses 140 form a drive member for being engaged by a complementary tool T, see FIG. 6. In alternative embodiments the drive member may be any specially formed shape that allows the retention ring 130 to be turned or driven. The drive member may be formed from apertures, slots, lugs, protrusions, corners or surfaces provided on the retention ring 130.

In yet another embodiment, the retention ring 130 may comprise a knurling on an external surface of the retention ring 130 to facilitate engagement by a user's hand.

The retention ring 130 comprises a plurality of second recesses 142 defined in a lower portion L. The illustrated embodiment comprises three second recesses 142. The second recesses 142 form part of a fastening mechanism for securing the retention ring 130 to the upper case member 114. The illustrated embodiment employs a bayonet style fastening mechanism. In an alternative embodiment shown in FIG. 8 the fastening mechanism takes the form of a screw thread. An external screw thread 270 is provided on a retention ring 230; an internal screw thread 272 is provided on the aperture A7. The retention ring 230 is passed over the right thumb stick 203 and screwed into the aperture A7 thereby securing the right thumb stick 203.

In other embodiments the fastening mechanism may be a push fitting and may comprise a detent or catch mounted on the retention ring 130 and the upper case member 114 for interlocking with a receiver such as a protrusion, ridge, aperture or recess provided on the other of the retention ring 130 and upper case member 114.

The apertures A6, A7 each comprise a plurality of lugs 132 (best shown in FIG. 5A); in the illustrated embodiment three lugs 132 are provided. The lugs 132 are circumferentially arranged so as to be complementary to the arrangement of the plurality of second recesses 142. Each of the lugs 132 comprises a lower shoulder 135 with which the lower portion L of the retention ring 130 engages so as to prevent, or at least mitigate against, undesirable egress of the retention rings 130 from the apertures A6, A7.

Each of the lugs 132 comprises an upper shoulder 134 upon which the upper portion U of the retention ring 130 rests so as to prevent, or at least mitigate against, the retention ring 130 from passing through the apertures A6, A7 and into an interior of the controller 101.

Optionally, the retention ring 130 comprises a first end stop E1 and a second end stop E2. The first end stop E1 is disposed in the groove 136. The second end stop E2 is disposed in the groove 136. The first end stop E1 and the second end stop E2 limit the range of travel or rotation of the retention ring 130 with respect to the outer case 114. The first end stop E1 and the second end stop E2 at least partially interrupt the groove 136 such that they abut with the lugs 132 thereby preventing further rotation of the retention ring 130.

Figure 6:
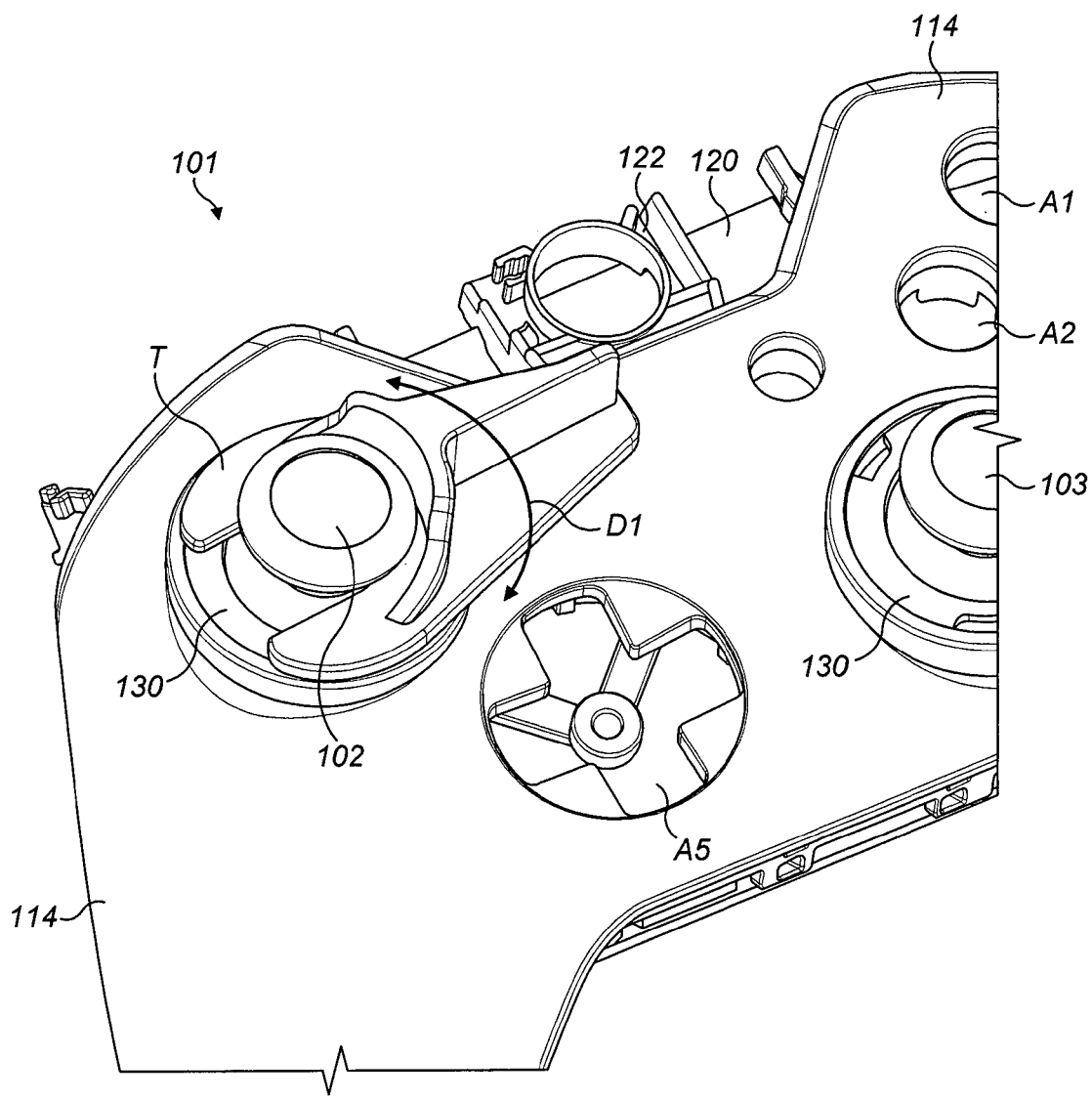
FIGS. 6 and 7 are perspective views from above of a disassembly of the controller of FIG. 2.
Figure 6:
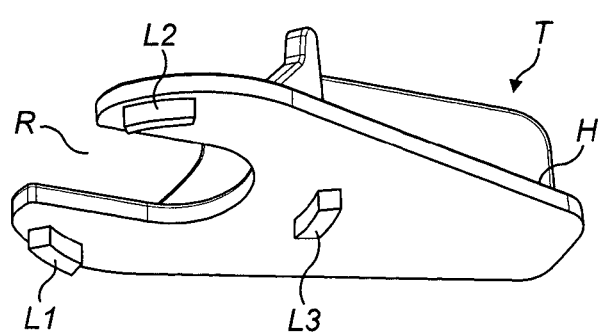
Figure 7:
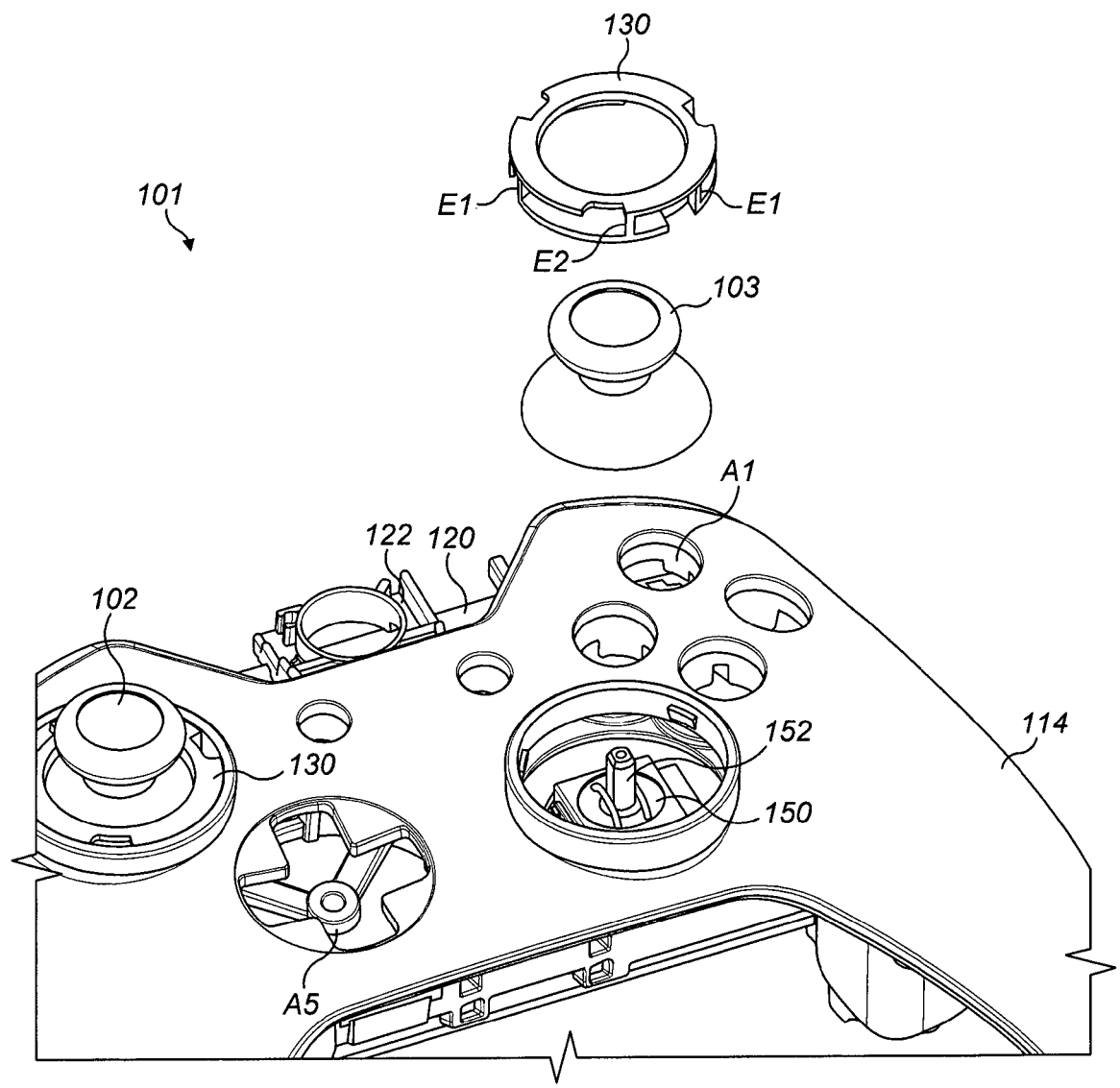
Figure 8:
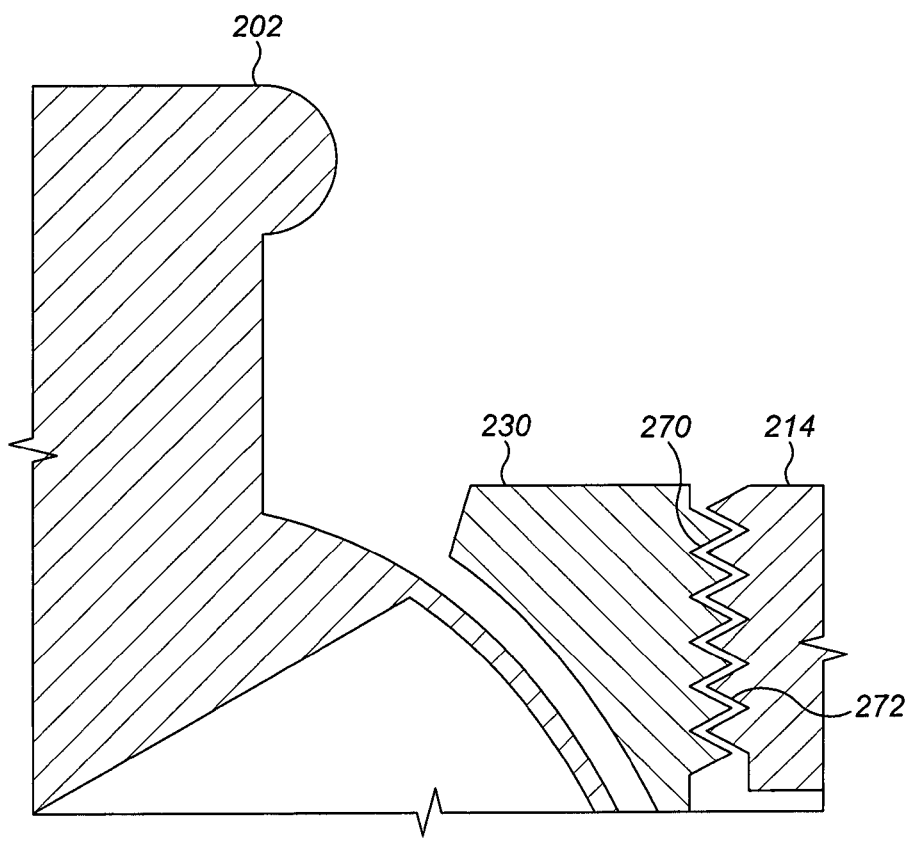
FIG. 8 is a schematic sectional view of a portion of a games controller according to a second embodiment of the invention.

The retention ring 130 has the effect of partially closing the apertures A6, A7 since the aperture A8 is smaller in diameter than the apertures A6, A7. In this way the left and right thumb sticks 102, 103 are prevented from being detached from the actuator mechanism 150 until the respective retention ring 130 is removed. FIG. 6 illustrates a stage of removal of the retention ring 130. A tool T is placed in engagement with the retention ring 130. The tool T comprises a plurality of lugs L1, L2, L3. The illustrated embodiment comprises three lugs L1, L2, L3 which are arranged in a complementary arrangement to the arrangement of the plurality of first recesses 140. Each lug L1, L2, L3 has a complementary shape to the shape of the respective recess 140 into which it is inserted. The tool T can be employed to move the retention ring 130 between a first position in which the retention ring 130 is locked to the upper case member 114 and a second position in which the retention ring 130 is unlocked. In the unlocked position the retention ring 130 can be withdrawn from the respective one of the apertures A6, A7 as shown in FIG. 7. The tool T comprises a handle which can be employed to apply a rotational force to the retention ring as indicated by direction arrow D1 in FIG. 6. The tool T comprises a recess R which is capable of accommodating a portion, such as the shaft, of the left and right thumb sticks 102, 103. In this way the tool T takes the form of a two pronged fork.

Once the retention ring 130 has been removed the right thumb stick 103 can be detached from the post 152 of the actuator mechanism 150 as shown in FIG. 7. The left thumb stick 102 can be removed by applying the process described above with respect to the right thumb stick 103 to the left thumb stick 102 and its respective retention ring 130.

The controller 101 can be reassembled by pushing the right thumb stick 103 onto the post 152 so that the post 152 is received in a bore in the right thumb stick 103. A lower portion of the right thumb stick 103 passes through the aperture A7 into the interior of the controller 101. The retention ring 130 is then passed over an upper portion of the right thumb stick 103 and is inserted into the aperture A7. The retention ring 130 must be correctly aligned; the plurality of second recesses 142 must be aligned with the lugs 132. The retention ring 130 is then rotated such that a section of the lower portion L of the retention ring 130 is disposed beneath each lug 132, thus locking the retention ring 130 within the aperture A7. The tool T can then be removed.

The tool T may be employed to insert the retention ring 130 within the aperture A7 or alternatively the retention ring 130 may be inserted by hand and then locked in position with the tool T. Similarly, the tool T may be utilised to facilitate withdrawal of the retention ring 130 from the aperture A7. In this regard the tool T may be capable of holding the retention ring 130 for example by a friction or interference fit.

In some embodiments the retention ring 130 may comprise a magnetic or ferrous material and the tool T may be magnetised for example as a permanent magnet.

The retention ring 130 may be formed of a hard wearing material so as to withstand repeated contact or impact with the right or left thumb stick 102, 103. In one embodiment the retention ring 130 is formed from a metallic material such as but not limited to anodised aluminium.

In other embodiments the retention ring 130 may be formed of a material which is softer than the material from which the left or right thumb stick 102, 103 and/or the upper case member 114 is made. In this way the retention ring 130 will fail before the left or right thumb stick 102, 103 and/or the upper case member 114. The retention ring 130 may, for example, but not limited to, be formed from a rubberised material or plastics material.

In yet other embodiments the retention ring 130 may be formed from the same material as the upper case member 114 or the left or right thumb stick 102, 103.

The retention ring 130 serves as a serviceable part which can be readily replaced.

The upper case member 114 is protected from impact with the left or right thumb stick 102, 103. The retention ring 130 forms a buffer between the upper case member 114 and the left or right thumb stick 102, 103

The retention ring 130 also provides a customisable part which can be mounted to the controller 101 either to provide a desired visual appearance or to customise the functionality of the thumb stick. For example, the retention ring 130 may be customisable to limit the travel of the thumb stick or the retention ring 130 may be customisable to provide a desired "feel" to the user when operating the thumb sticks 102, 103. The "feel" will be dependent upon the materials from which the retention ring 130 is formed. The retention ring may provide a soft "feel" or cushioned endstop (for example if comprising rubberised material or other resiliently deformable material) or a hard "feel" endstop (for example if comprising a metallic material such as anodised aluminium).

It is envisaged that the controllers may be coupled to a games console or computer by a wired connection or by a wireless connection device.

It will be recognised that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. A hand held controller for a games console or other computing device comprising:
   an outer case configured to be held in a user's hands during operation, the outer case including a front surface and a top end adjacent the front surface;
   a plurality of top controls located on the top end configured to be operated by the user's index finger;
   a thumb stick located at the front surface configured to be operated by the user's thumbs and removably mounted to a protrusion of an actuator mechanism, the actuator mechanism configured to move in at least an x and y direction with respect to the outer case, the actuator mechanism coupled to circuitry contained within the outer case, the thumb stick comprising an upper portion that extends through a case aperture provided in the outer case, wherein the upper portion of the thumb stick is configured to move within the case aperture; and
   a buffer removably mounted within the case aperture by a fastening mechanism of the buffer, wherein the buffer is configured to accommodate the upper portion of the thumb stick disposed external to the outer case, and wherein the upper portion of the thumb stick contacts the buffer when the thumb stick is moved to a travel limit within the case aperture.

2. The hand held controller of claim 1, wherein the buffer comprises a first fastening part of a mechanical fastening system configured to affix to a second fastening part of the mechanical fastening system included in the front surface.

3. The hand held controller of claim 2 wherein the second fastening part is included in the case aperture.

4. The hand held controller of claim 1 wherein the thumb stick further comprises a lower portion disposed internal to the outer case.

5. The hand held controller of claim 1 comprising:
   a second thumb stick located at the front surface and removably mounted to a protrusion of a second actuator mechanism configured to move in at least an x and y direction with respect to the outer case, the second actuator mechanism coupled to second circuitry contained within the outer case, the second thumb stick comprising an upper portion that extends through a second case aperture provided in the outer case, wherein the upper portion of the second thumb stick is configured to move within the second case aperture; and
   a second buffer removably mounted within the second case aperture by a second fastening mechanism of the second buffer, wherein the second buffer is configured to accommodate the upper portion of the second thumb stick disposed external to the outer case, and
   wherein the upper portion of the second thumb stick contacts second the second buffer when the second thumb stick is moved to a travel limit within the second case aperture.

6. The hand held controller of claim 5 wherein the buffer is interchangeable with the second buffer.

7. The hand held controller of claim 6 wherein the buffer is formed from the same material as the second buffer.

8. The hand held controller of claim 5 wherein the second thumb stick further comprises a lower portion disposed internal to the outer case.

9. The hand held controller of claim 1 wherein the fastening mechanism comprises a push fitting.

10. The hand held controller of claim 1 wherein buffer comprises a ring.

11. The hand held controller of claim 1 wherein the protrusion of the actuator mechanism comprises a self-centering analogue stick.

12. The hand held controller of claim 1 wherein the buffer is formed from a plastics material.

13. An input apparatus for a computing device comprising:
   an outer case comprising a front surface and a top edge, wherein the front surface includes a case aperture;
   a top control located at the top edge and configured to be operated by an index finger of a user;
   a thumb stick disposed in the case aperture in the front surface and removably mounted to a protrusion of an actuator mechanism, the protrusion configured to move in multiple directions with respect to the outer case, the actuator mechanism coupled to electronics located within the outer case, the thumb stick configured to be operated by a thumb of the user, wherein an upper portion of the thumb stick is configured to extend from outside the outer case into the case aperture and move within the case aperture; and
   a buffer removably coupled within the case aperture by a fastening system, wherein the buffer comprises a buffer aperture configured to accommodate at least part of the upper portion of the thumb stick when the buffer is coupled to the outer case, the buffer configured to not move with respect to the outer case when mounted and configured to prevent contact between the upper portion of the thumb stick and the outer case when the thumb stick is moved to a travel limit within the case aperture, wherein at least part of the fastening system is included in the buffer.

14. The input apparatus of claim 13 wherein the thumb stick further comprises a lower portion disposed internal to the outer case.

15. The input apparatus of claim 13, wherein a second part of the fastening system is included in the front surface.

16. The input apparatus of claim 15, wherein the second part of the fastening system is located in the case aperture.

17. The input apparatus of claim 16 further comprising a second control located on the top end, the second control configured to be operated by a second index finger of the user.

18. The input apparatus of claim 13 wherein the protrusion of the actuator mechanism comprises a self-centering analogue stick.

19. The input apparatus of claim 13 wherein the fastening system comprises a push fitting.

20. The input apparatus of claim 13 wherein the buffer comprises a ring.

* * * * *